US009116933B2

(12) United States Patent
John

(10) Patent No.: US 9,116,933 B2
(45) Date of Patent: Aug. 25, 2015

(54) INTERFACE OPTIMIZING MODEL BASED UPON DATABASE INFORMATION

(71) Applicant: SAP AG, Walldorf (DE)

(72) Inventor: Jerry John, Bangalore (IN)

(73) Assignee: SAP SE, Walldorf (DE)

( * ) Notice: Subject to any disclaimer, the term of this patent is extended or adjusted under 35 U.S.C. 154(b) by 232 days.

(21) Appl. No.: 13/858,361

(22) Filed: Apr. 8, 2013

(65) Prior Publication Data
US 2014/0304308 A1    Oct. 9, 2014

(51) Int. Cl.
*G06F 17/30* (2006.01)
(52) U.S. Cl.
CPC ................ *G06F 17/30294* (2013.01)
(58) Field of Classification Search
None
See application file for complete search history.

(56) References Cited

U.S. PATENT DOCUMENTS

| | | | |
|---|---|---|---|
| 5,734,884 A * | 3/1998 | Eberhard et al. ................. 1/1 |
| 8,335,794 B1 * | 12/2012 | Goodson et al. ............. 707/759 |
| 8,484,355 B1 * | 7/2013 | Lochhead et al. ........... 709/226 |
| 8,966,462 B2 * | 2/2015 | Gounares et al. ............ 717/148 |
| 2004/0139085 A1 * | 7/2004 | Eryurek et al. .............. 707/100 |
| 2007/0219944 A1 * | 9/2007 | Liu et al. ......................... 707/2 |
| 2007/0250538 A1 * | 10/2007 | Moore ......................... 707/104.1 |
| 2009/0138436 A1 * | 5/2009 | Halberstadt et al. ............. 707/3 |
| 2010/0125665 A1 * | 5/2010 | Simpson et al. .............. 709/224 |
| 2010/0185614 A1 * | 7/2010 | O'Brien et al. .............. 707/736 |
| 2011/0047418 A1 * | 2/2011 | Drees et al. ..................... 714/57 |
| 2012/0323929 A1 * | 12/2012 | Kimura et al. ............... 707/748 |
| 2013/0060795 A1 * | 3/2013 | Plasek et al. ................. 707/755 |
| 2014/0095428 A1 * | 4/2014 | Beresniewicz et al. ....... 707/609 |

OTHER PUBLICATIONS

Erich Schneider and Raghav Jandhyala, "SAP HANA® Platform—Technical Overview Driving Innovations in IT and in Business with In-Memory Computing Technology," 2012.
Jonathan Haun, "Data Modeling vs Analytic Modeling in SAP HANA," blog at WordPress.com, May 11, 2012.

* cited by examiner

*Primary Examiner* — Hung Le
(74) *Attorney, Agent, or Firm* — Fountainhead Law, Group PC

(57) ABSTRACT

Embodiments relate to interfaces allowing a user to optimize a model which references and manipulates volumes of information present in an underlying database. An interface engine of an application layer, may communicate with the database engine of an underlying database layer, to provide a user with indicia of modeling performance. Thus for every modeling step, an interface engine could display performance indicia such as a number of database rows that are being referenced, and/or an amount of time consumed in retrieving the data from the database. This performance indicia, together with a structure of the model itself, can be processed by the interface engine through a repository of optimization recommendations. Recommendations from the repository may be published to the user, who is free to accept or reject them. Particular embodiments may leverage processing capacity of an in-memory database engine, to analyze database information gathered during modeling.

14 Claims, 13 Drawing Sheets

INTERFACE OPTIMIZING MODEL BASED UPON DATABASE INFORMATION

BACKGROUND

Embodiments of the present invention relate to databases, and in particular to user interfaces allowing optimization of models that reference data from an underlying database.

Unless otherwise indicated herein, the approaches described in this section are not prior art to the claims in this application and are not admitted to be prior art by inclusion in this section.

Databases offer a way of storing large volumes of related information in a powerful and efficient manner. Information stored in database(s), may be accessed by a user as part of modeling efforts, for example to describe ongoing behavior of a complex system, and then to predict future behavior of such a system.

As part of its operation, a model may seek to manipulate database information in a computationally-intensive manner. For example, a model may comprise multiple steps that each call for combination (e.g. by UNION or JOIN operations) of thousands or even millions of stored database records.

Currently, few tools allow an end user to evaluate and/or refine properties of a model based upon its performance. Instead, modeling is typically conducted in an ad-hoc manner, utilizing trial-and-error based primarily upon the end user's past experience. Such manual approaches to model creation/optimization are time-consuming, and are limited to those select few end users with sufficient experience affording an intuitive grasp of model structure and performance.

Moreover the difficulty of evaluating and optimizing model performance may be exacerbated, as the underlying databases and the models accessing them, increase in size and complexity. The pool of available end users may be even further limited, when models are imported from an external source into an existing modeling tool.

Accordingly, embodiments address these and other issues with user interfaces affording optimization of models based upon database information.

SUMMARY

Embodiments relate to interfaces allowing a user to optimize a model which references and manipulates volumes of information present in an underlying database. An interface engine of an application layer, may communicate with the database engine of an underlying database layer, to provide a user with indicia of modeling performance. Thus for every modeling step, an interface engine could display performance indicia such as a number of database rows that are being referenced, and/or an amount of time consumed in retrieving the data from the database. This performance indicia, together with a structure of the model itself, can be processed by the interface engine through a repository of optimization recommendations. Recommendations from the repository may be published to the user, who is free to accept or reject them. Particular embodiments may leverage processing capacity of an in-memory database engine, to analyze database information gathered during modeling.

An embodiment of a computer-implemented method comprises providing a modeling engine within an application layer that is in communication with a database of a database layer via a database engine. The modeling engine is caused to construct a model referencing the database. The modeling engine is caused to execute a step of the model. The modeling engine is caused to receive a performance indicia of execution of the step, and the modeling engine is caused to display the performance indicia on a user interface.

A non-transitory computer readable storage medium embodies a computer program for performing a method comprising providing a modeling engine within an application layer that is in communication with a database of a database layer via a database engine. The modeling engine is caused to construct a model referencing the database. The modeling engine is caused to execute a step of the model. The modeling engine is caused to receive a performance indicia of execution of the step, and the modeling engine is caused to display the performance indicia on a user interface.

An embodiment of a computer system comprises one or more processors and a software program executable on said computer system. The software program is configured to provide a modeling engine within an application layer that is in communication with a database of a database layer via a database engine. The software program is further configured to cause the modeling engine to construct a model referencing the database. The software program is also configured to cause the modeling engine to execute a step of the model. The software program is further configured to cause the modeling engine to receive a performance indicia of execution of the step, and to cause the modeling engine to display the performance indicia on a user interface.

In certain embodiments the performance indicia is selected from a time to execute the step, a number of database rows accessed by the step, and a computing power consumed by the step.

According to some embodiments the modeling engine is further configured to generate an optimization value from the performance indicia, and to provide the optimization value to the user interface.

In particular embodiments the modeling engine is further configured to generate an optimization recommendation from the performance indicia, and to provide the optimization recommendation to the user interface.

In various embodiments the modeling engine is further configured to receive from the user interface an acceptance of the optimization recommendation, and to modify the model based upon the optimization recommendation.

According to some embodiments the application layer is situated in a same device with the database layer.

In certain embodiments the database comprises an in memory database, and the modeling engine leverages a computational power of the database engine.

The following detailed description and accompanying drawings provide a better understanding of the nature and advantages of particular embodiments.

DETAILED DESCRIPTION

Described herein are techniques for optimizing modeling that operates based upon data gathered from an underlying database. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Embodiments relate to interfaces allowing a user to optimize a model which references and manipulates volumes of information present in an underlying database. An interface engine of an application layer, may communicate with the database engine of an underlying database layer, to provide a user with indicia of modeling performance. Thus for every modeling step, an interface engine could display performance indicia such as a number of database rows that are being referenced, and/or an amount of time consumed in retrieving the data from the database. This performance indicia, together with a structure of the model itself, can be processed by the interface engine through a repository of optimization recommendations. Recommendations from the repository may be published to the user, who is free to accept or reject them. Particular embodiments may leverage processing capacity of an in-memory database engine, to analyze database information gathered during modeling.

Figure 1:
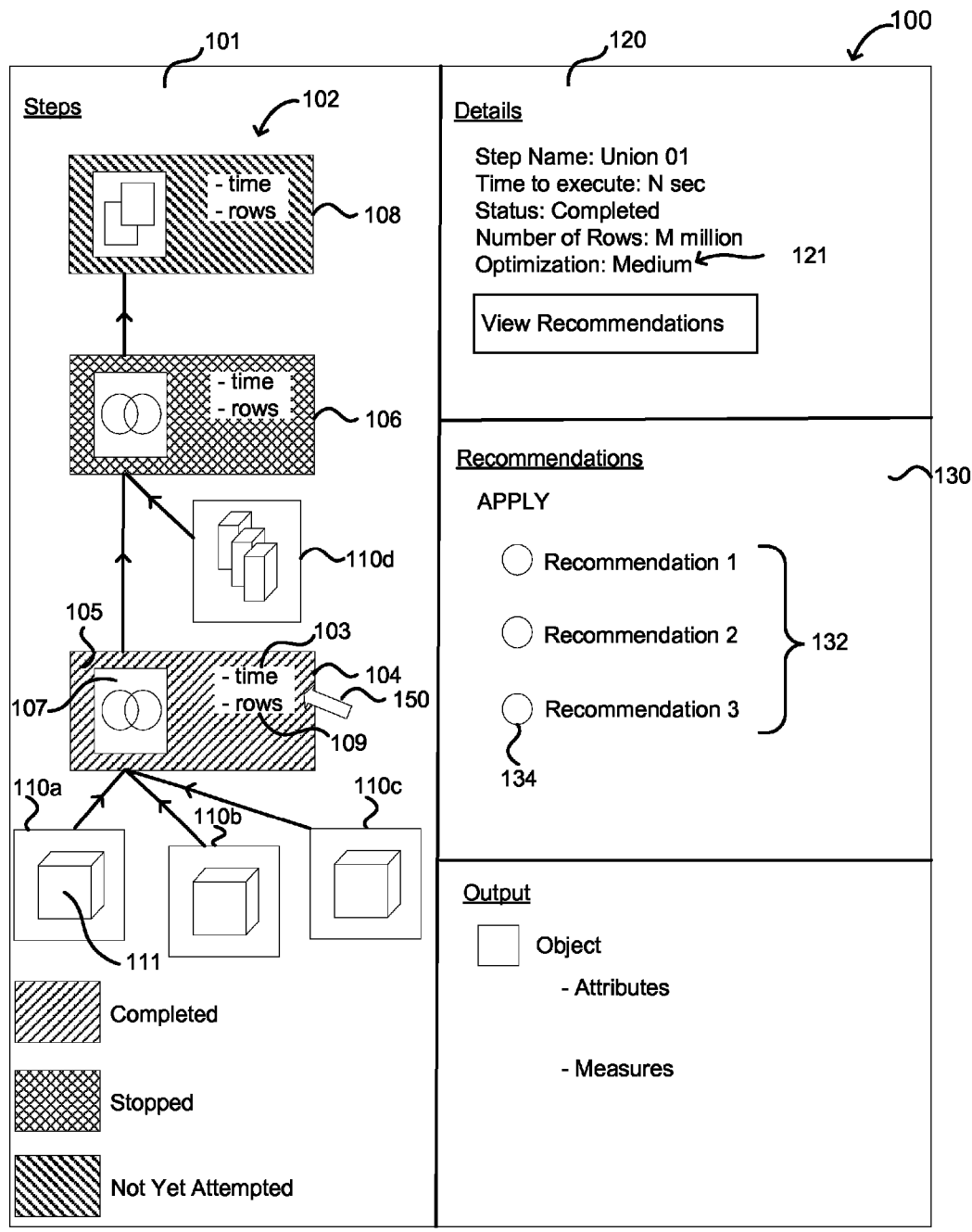
FIG. 1 provides a generic view of an embodiment of a modeling interface according to an embodiment.

FIG. 1 provides a generic view of an embodiment of a modeling interface 100 according to an embodiment. In particular, the user interface 100 includes a first field 101 showing a model structure 102 as a plurality of steps 104, 106, and 108. These steps are shown as rectangles, with data sources 110a-d shown as squares. In this particular interface, the flow of steps of the model is shown by arrows as progressing in an upward direction.

In the field 101 of the interface 100, the rectangles showing each step of the model may include one or more of the following pieces of information:
  an icon 107 indicating a step type (e.g. UNION, JOIN, Aggregation, Filter, Projection, Script);
  a color 105 indicating a status of the step (e.g. completed, pending, not yet attempted, stopped etc.);
  a time taken to execute the step; and
  a number of database rows accessed by the step.

Also in the field 101 of the interface 100, the squares showing data sources 110a-d of the model may include one or more of the following pieces of information:
  an icon 111 indicating a type of the data source: e.g. a file, an infocube, a data store object (DSO).
  file size, cube dimensions/volume, DSO structure, data origin (e.g. SAP, 3$^{rd}$ PARTY)

The interface 100 also comprises other fields. Field 120 provides detailed information regarding a particular step of the model structure depicted in the interface Field 101. The particular step can be selected by user input (e.g. cursor 150 or touching an area of a touchscreen) for viewing additional details.

FIG. 1 shows that in addition to step type, status, time, and row information inferable from the model structure field, the detail field 120 of the interface may also provide an evaluation of the performance of that particular step. The performance of a step in the model may be revealed by certain indicia. Examples of such performance indicia include but are not limited to time, and number of rows accessed.

Another modeling step performance indicia may be a number of steps in-between from the DSO to the final semantic node of a model. This can be relevant as the greater the complexity in the transformations, the longer it may take to retrieve the desired result on the expected modeling step.

Based upon comparison of the certain performance indicia, a modeling engine may determine that the step is being conducted in a relatively inefficient manner. Accordingly, the detail field 120 of the user interface may reflect an optimization value 121 (e.g. Medium, Low, High).

The detail field may also provide for a user to access recommendations provided by the modeling engine in conjunction with returning an optimization value. For example, the field 120 also includes a "View Recommendations" box, activation of which results in the display of a Recommendations field 130 in the user interface.

In this recommendations field 130, for a selected step the user can now see various recommendations of optimizing and streamlining the model. These recommendations may be generated by the modeling engine referencing a rule set based upon performance indicia and/or other information. As shown here, the field provides a list of recommendations 132, which the user can select with check boxes 134.

Once the user clicks "APPLY", the recommendations selected are applied to the model. Based on the modeling steps identified in the model, a "Best" set of recommendations is tailor-made to make this model optimized. The user can take actions on all the recommendations, the recommendations that are grouped by an action type (e.g.: all recommendations to delete redundant columns) or an individual action. The depiction of the model structure in the interface field 101, would then be updated to reflect the change.

The modeling interface may include fields in addition to those for model structure, step detail, and optimization recommendations. For example, field 140 of the interface shown in FIG. 1 is configured to display outputs of the particular step selected by the user.

As indicated above, a modeling engine may be responsible for furnishing the modeling interface, receiving inputs from a user thereto, and providing corresponding outputs that are reflected in the modeling interface. By virtue of its access to information of an underlying database upon which the model is constructed, the modeling engine is configured to interact closely with the database engine of a database layer.

Figure 2:
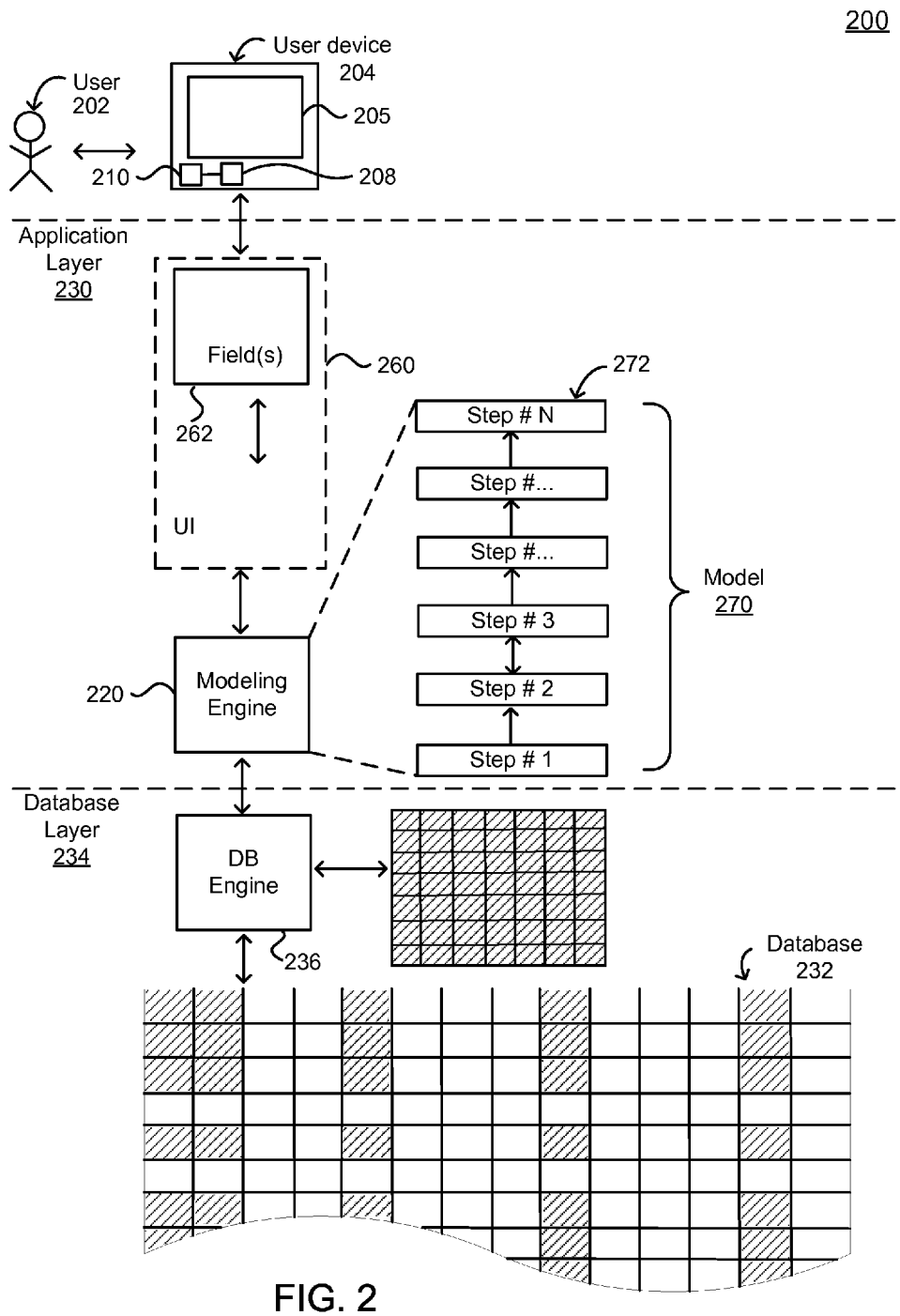
FIG. 2 shows a simplified generic view of a system configured to provide a modeling interface according to an embodiment.

Specifically, FIG. 2 shows a simplified generic view of a system configured to provide a modeling interface according to an embodiment. System 200 comprises user 202 who is in communication with a user device 204.

In certain embodiments, the user device may be portable in nature, for example comprising a mobile device such as a smartphone, tablet, or laptop computer. However, this is not required, and in other embodiments the user device could comprise a desktop computer or workstation.

The user device 204 may comprise input/output element 205, for example a touchscreen. Alternatively, separate input/output elements (e.g. keyboard and screen) could be employed.

The user device may include a processor 208 that is configured to receive inputs, and to provide outputs. The processor may be in communication with a non-transitory computer-readable storage medium 210 having code stored thereon.

In certain embodiments, the processor of the user device may comprise the modeling engine that is responsible for creation and manipulation of the model. In other embodiments, the processor of the user device may offer less functionality, and may simply be configured to display outputs and receive inputs according to instructions received from an interface engine that is located outside of the user device.

In particular, the modeling engine 220 may reside within an application layer 230 that is in communication with a database 232 located within a database layer 234. Access to the database from outside the database layer, is governed by the database engine 236.

In certain embodiments, the database 232 may comprise a conventional disk based database. According to some embodiments, the database 232 may comprise an in memory database. One example of such an in memory database is the HANA database available from SAP AG of Walldorf, Germany. Other examples of in memory databases can include but are not limited to, the SYBASE IQ database also available from SAP AG, the Microsoft Embedded SQL for C (ESQL/C) database available from Microsoft Corp. of Redmond, Wash., and the Exalytics In-Memory database available from Oracle Corp. of Redwood Shores, Calif. In particular embodiments (e.g. where the database comprises an in memory database), the database engine could also function as the interface engine.

In certain embodiments, the modeling engine 220 may provide a modeling user interface (UI) 260 that furnishes one or more fields 262, as have been described above. A user can interact with the modeling engine via the interface, in order to cause the database engine to extract and display information of the database relevant to a model 270 comprising steps 272.

Figure 2A:
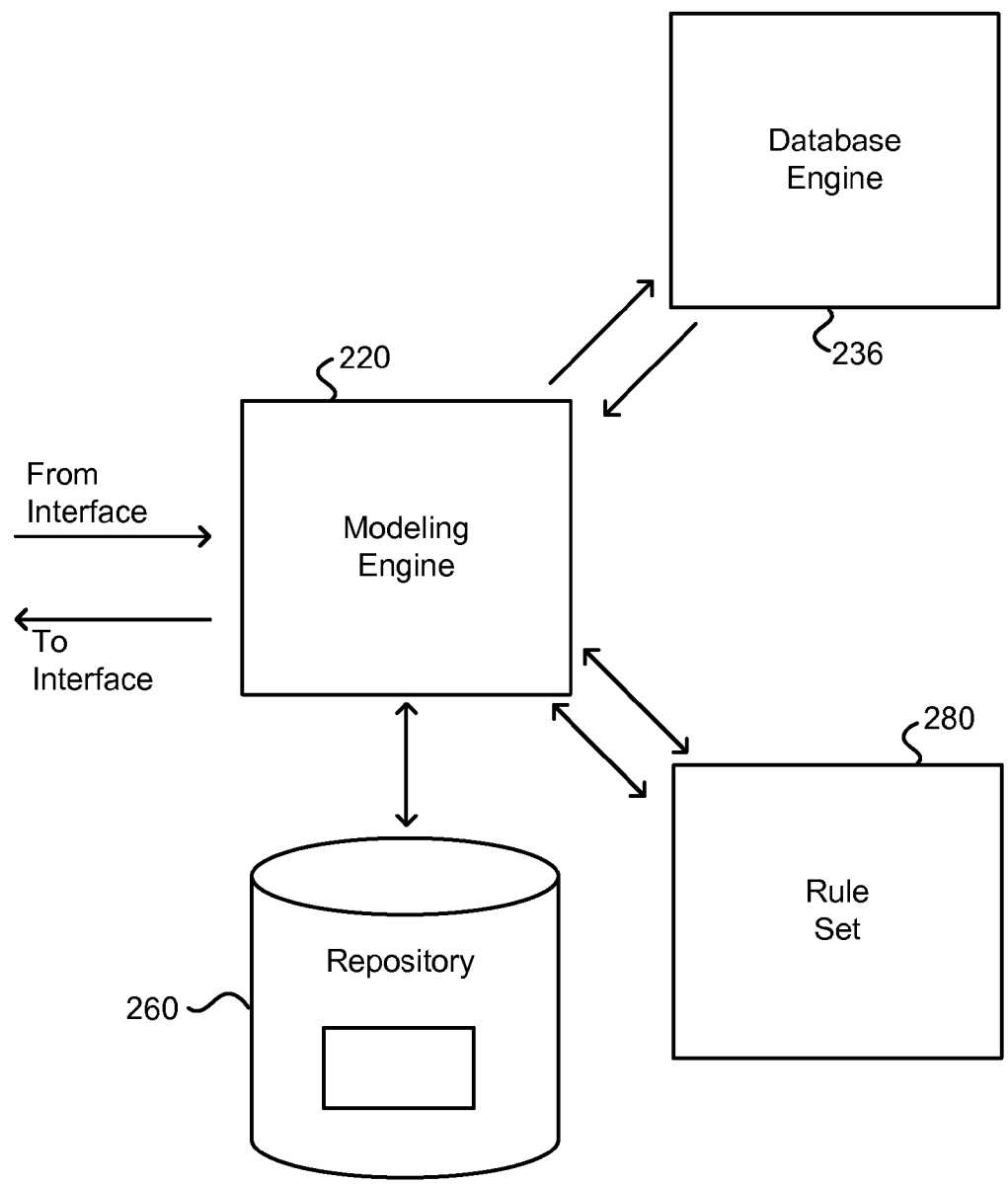
FIG. 2A is a simplified block diagram showing a role of a modeling engine according to an embodiment.

FIG. 2A is a simplified block diagram depicting a role of the modeling engine in general terms. Specifically, the modeling engine 220 is configured to create and store in a repository 260, the model 270 referencing database information.

Accordingly, the modeling engine is configured to receive inputs comprising various user commands to the modeling interface, and in response thereto provide relevant information back to the modeling interface. Examples of such information may comprise database information relevant to modeling steps, as communicated by database engine 220.

Other examples of information handled by the modeling engine may include indicia of model performance. Such performance indicia may be obtained from a variety of sources.

For example, certain types of performance indicia may be obtained from the database engine (e.g. number of database rows accessed). Other performance indicia (e.g. time to perform a modeling step, memory consumption by a modeling step) may be obtained from a processor responsible for administering operations within the application layer.

Still other types of information that may be processed by the modeling engine, may include optimization values, and corresponding recommendations for model optimization. These recommendations may be generated with reference to a rule set 280, on the basis of performance indicia provided.

Figure 3:
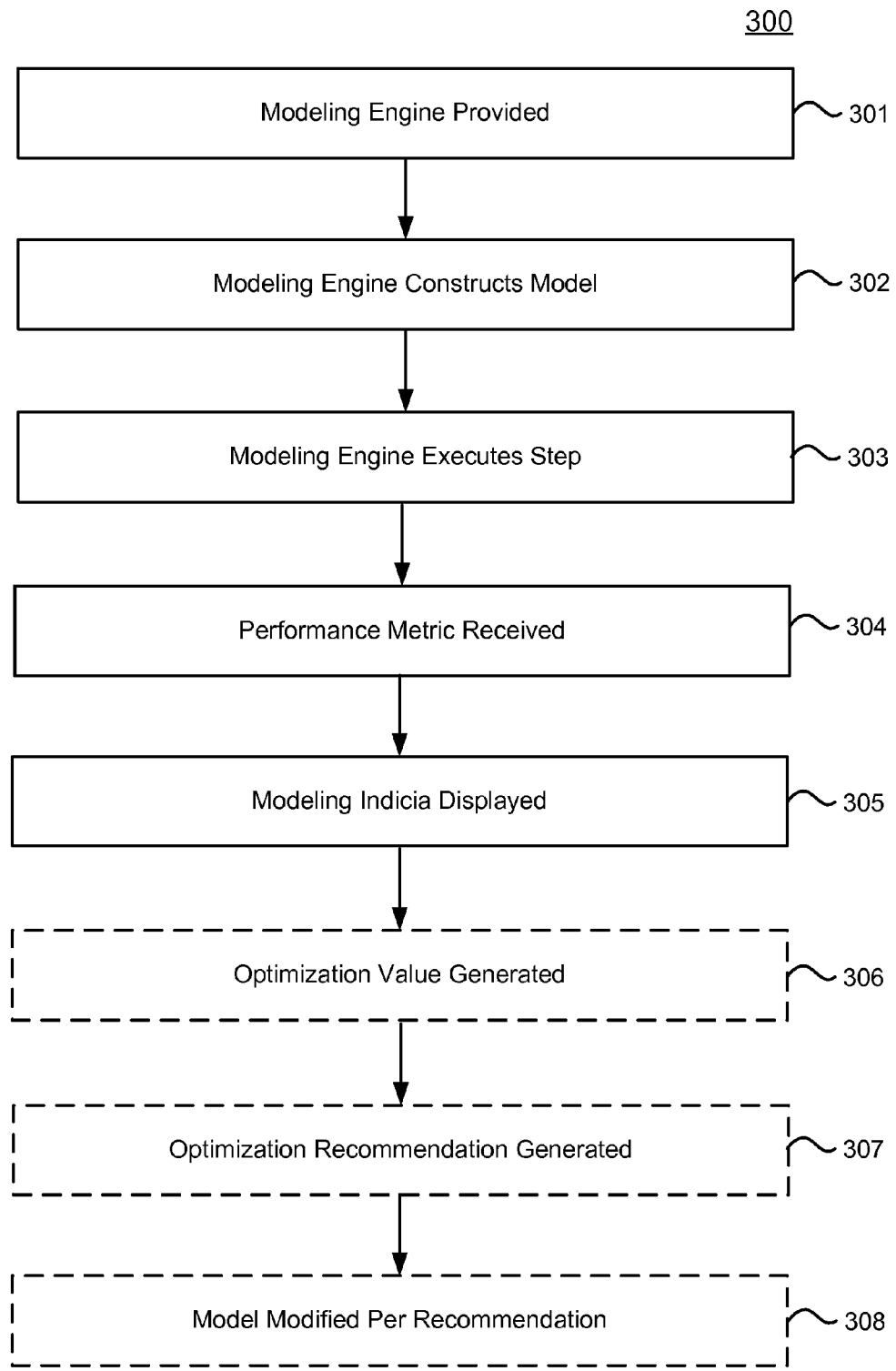
FIG. 3 is a simplified flow diagram illustrating steps of a method according to an embodiment.

FIG. 3 is a simplified flow diagram illustrating steps of a method 300 according to an embodiment. In a first step 301 a modeling engine is provided within an application layer that is in communication with a database of a database layer via a database engine.

In a second step 302, the modeling engine is caused to construct a model referencing the database. In a third step 303, the modeling engine is caused to execute a step of the model.

In a fourth step 304, the modeling engine is caused to receive a performance metric reflecting execution of the step. In a fifth step 305 the modeling engine is caused to display a performance indicia on a user interface.

In an optional sixth step 306, the modeling engine is further configured to generate an optimization value from the performance indicia, and to provide the optimization value to the user interface.

In an optional seventh step 307, the modeling engine is further configured to generate an optimization recommendation from the performance indicia, and to provide the optimization recommendation to the user interface.

In an optional eighth step 308, the modeling engine is further configured to receive from the user interface an acceptance of the optimization recommendation, and to modify the model based upon the optimization recommendation.

Additional details regarding the structure and operation of various embodiments, may be understood from the specific example that is presented below.

EXAMPLE

Figure 4A:
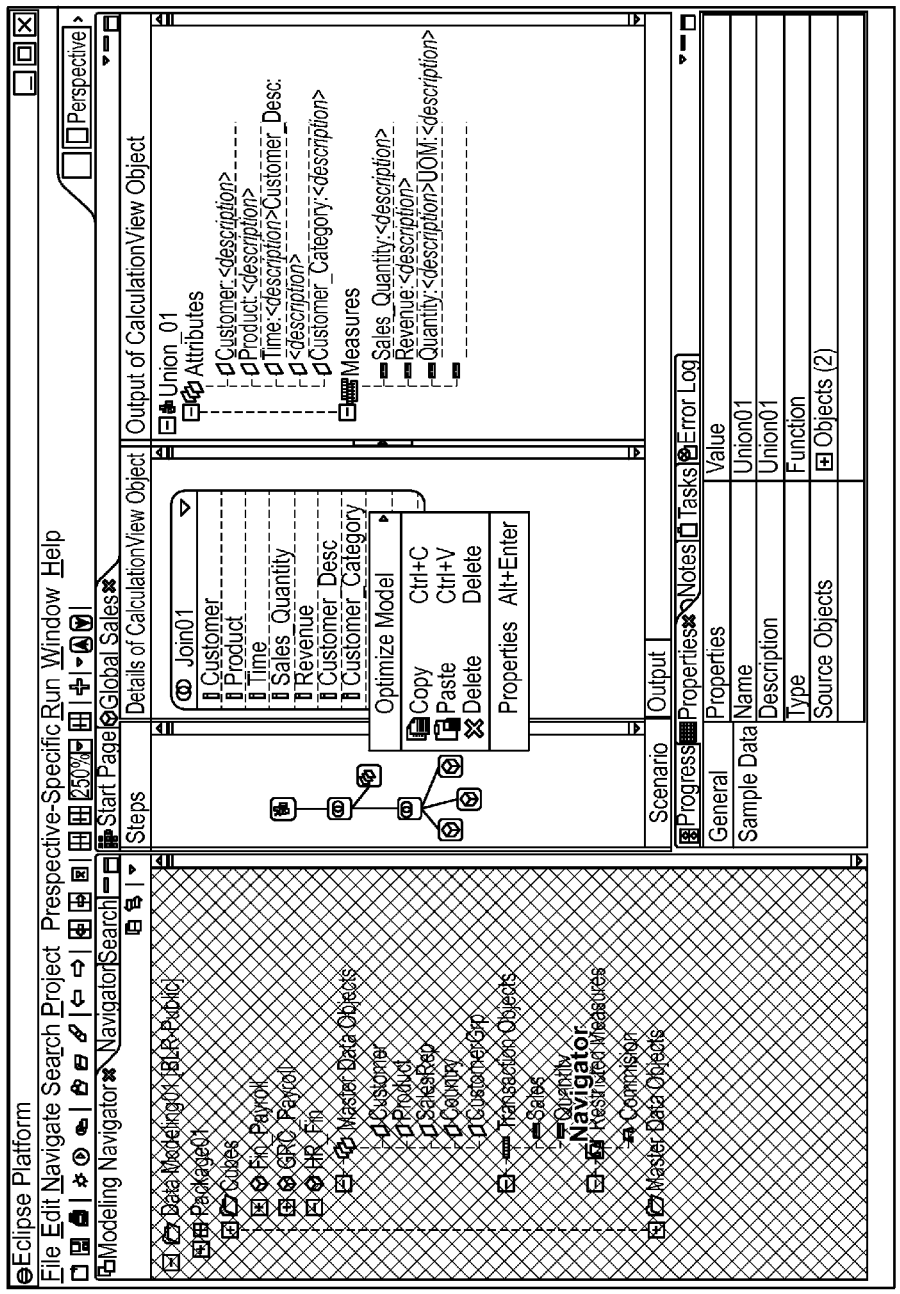
FIGS. 4AA-BC show sample screen shots for a modeling interface.
Figure 4A:
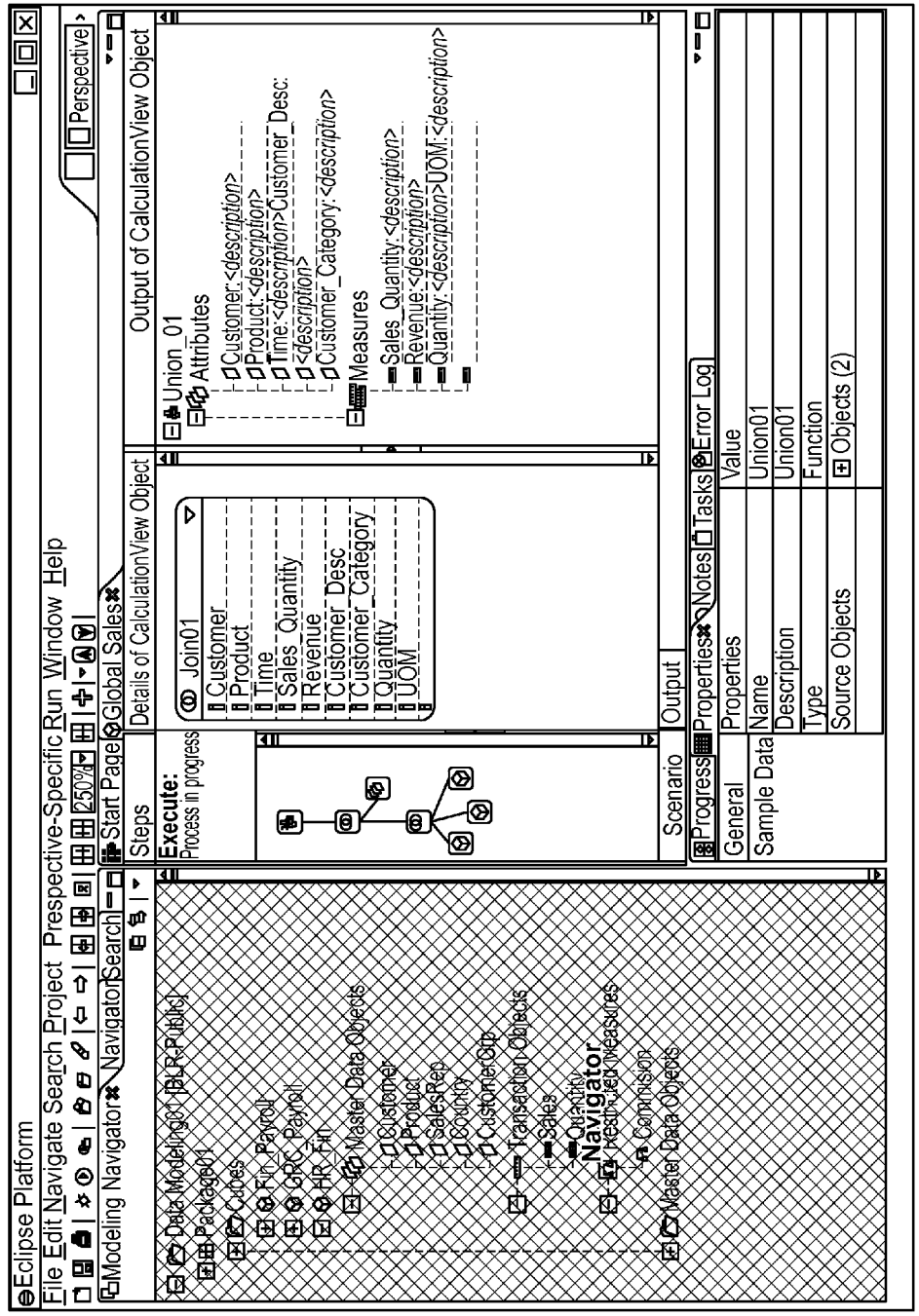
Figure 4A:
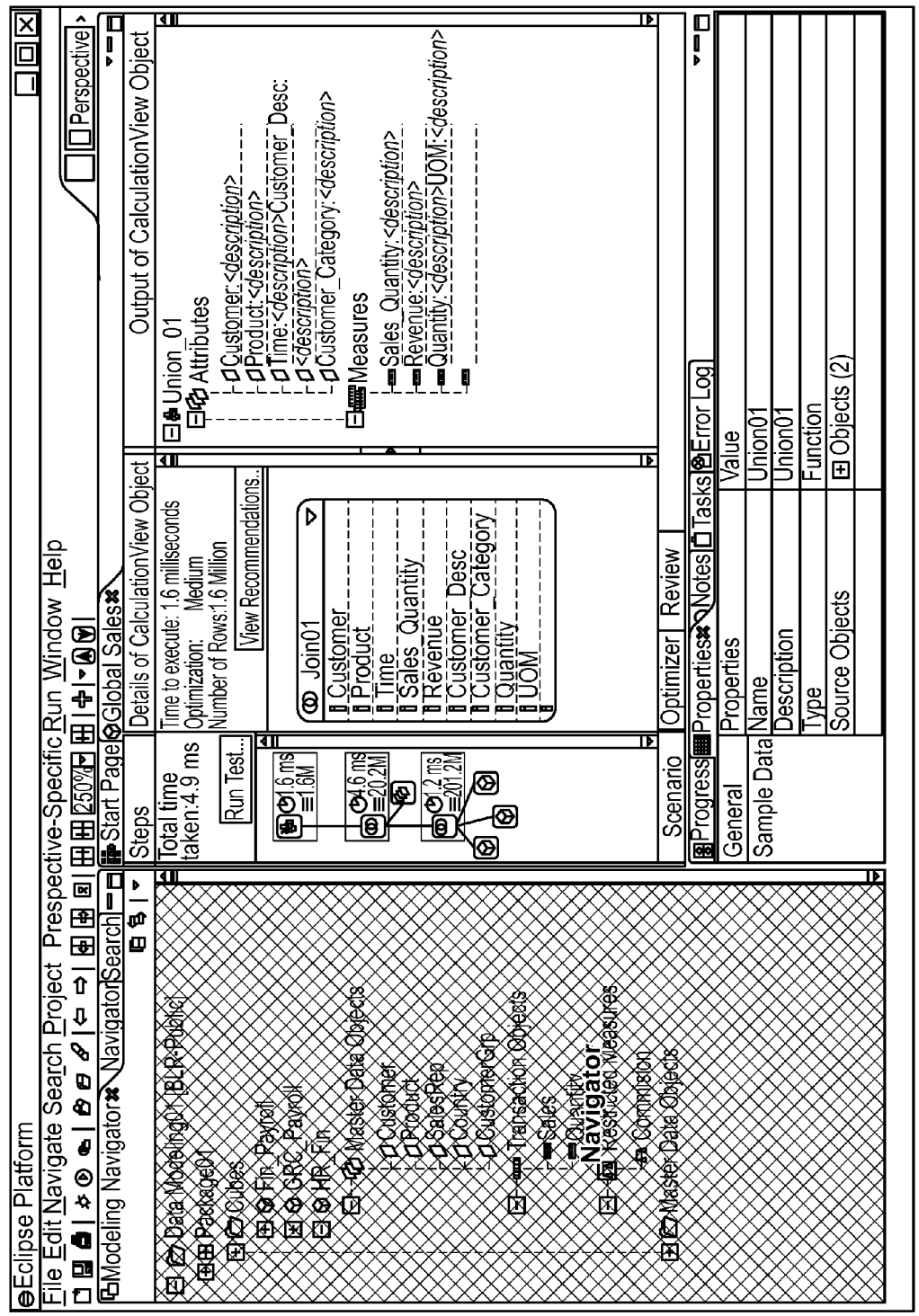
Figure 4A:
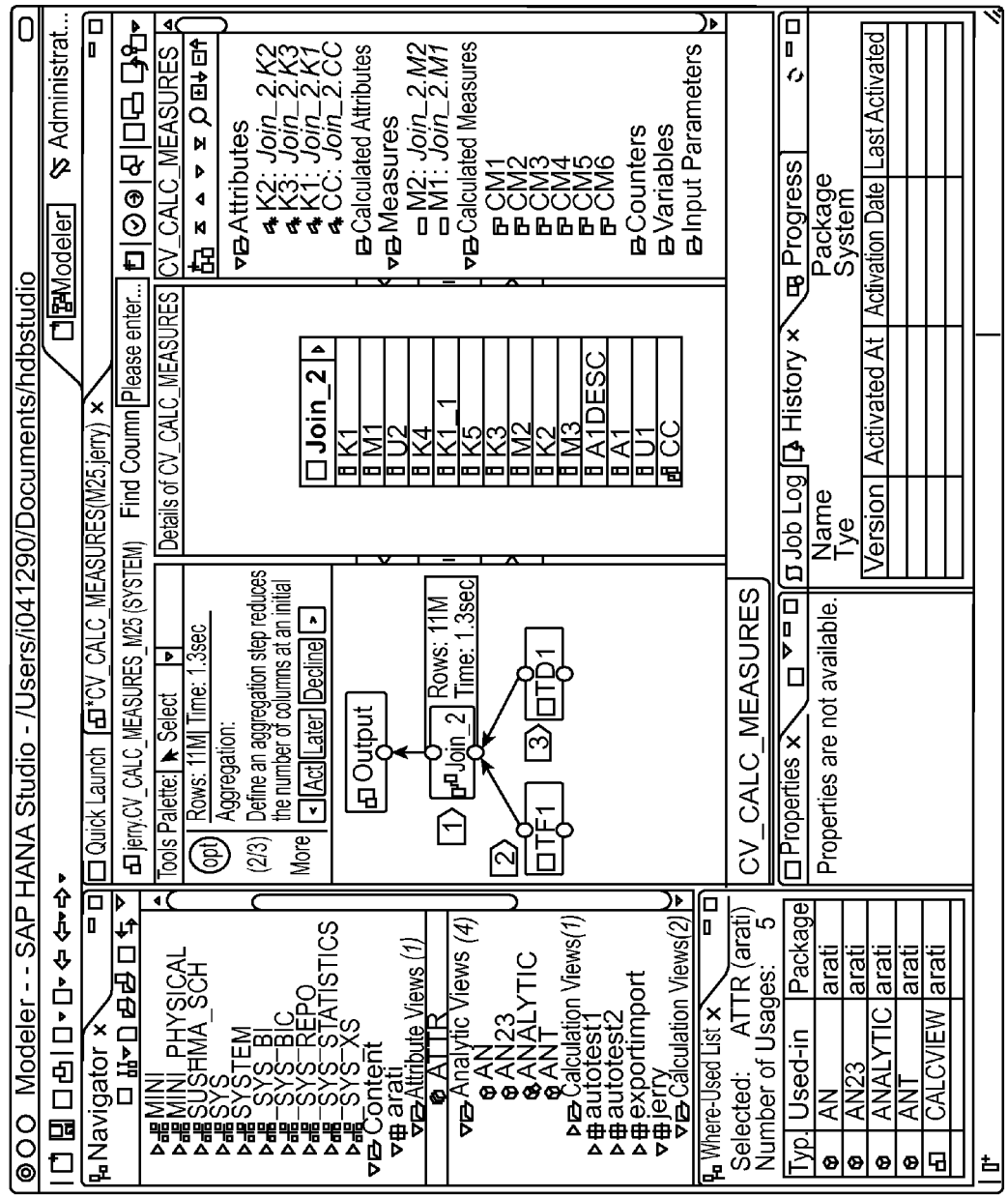

FIGS. 4AA-AD show screen shots for one example of a modeling interface according to an embodiment. The screen shots of this interface focus upon the presentation of information relating to model creation and evaluation.

FIG. 4AA shows a first screen of a user interface wherein the user creates a model using the calculation view. The user can now choose to see if the model is optimized, by right clicking on the scenario panel and selecting optimize model.

FIG. 4AB shows a second interface screen wherein the optimizer is running and consolidates. FIG. 4AC shows a third interface screen wherein the optimizer has run with the recommendations up-front to the user.

In the screen of FIG. 4AC, the user can see a report per node. In particular, the "Steps" panel denotes the time, number of rows, and the overall status of that step. Basic color differentiates between steps.

The box at the top of the "Details of Calculation/View Object" shows details of the step level information of the optimization.

For a selected step, the user can now see recommendations of optimizing and streamlining the Model. The user can then take actions on the recommendations that have been suggested.

This may take the form of a list of recommendations which the user can select with check boxes. Once the user provides an input to the interface, the recommendations can be applied to the model.

FIG. 4AD shows a fourth screen displaying an alternate visualization of the information of FIG. 4AC.

Figure 4B:
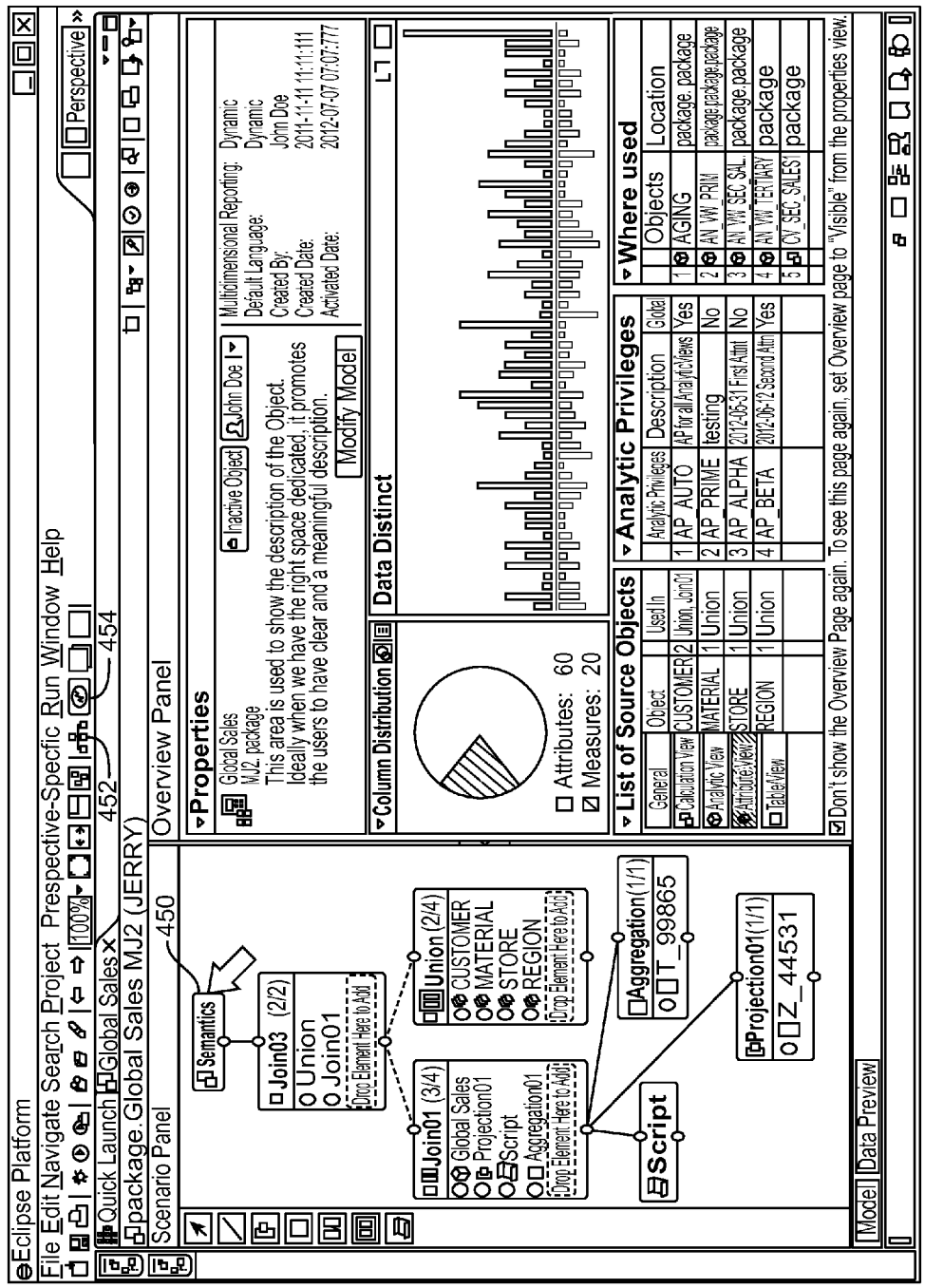
Figure 4B:
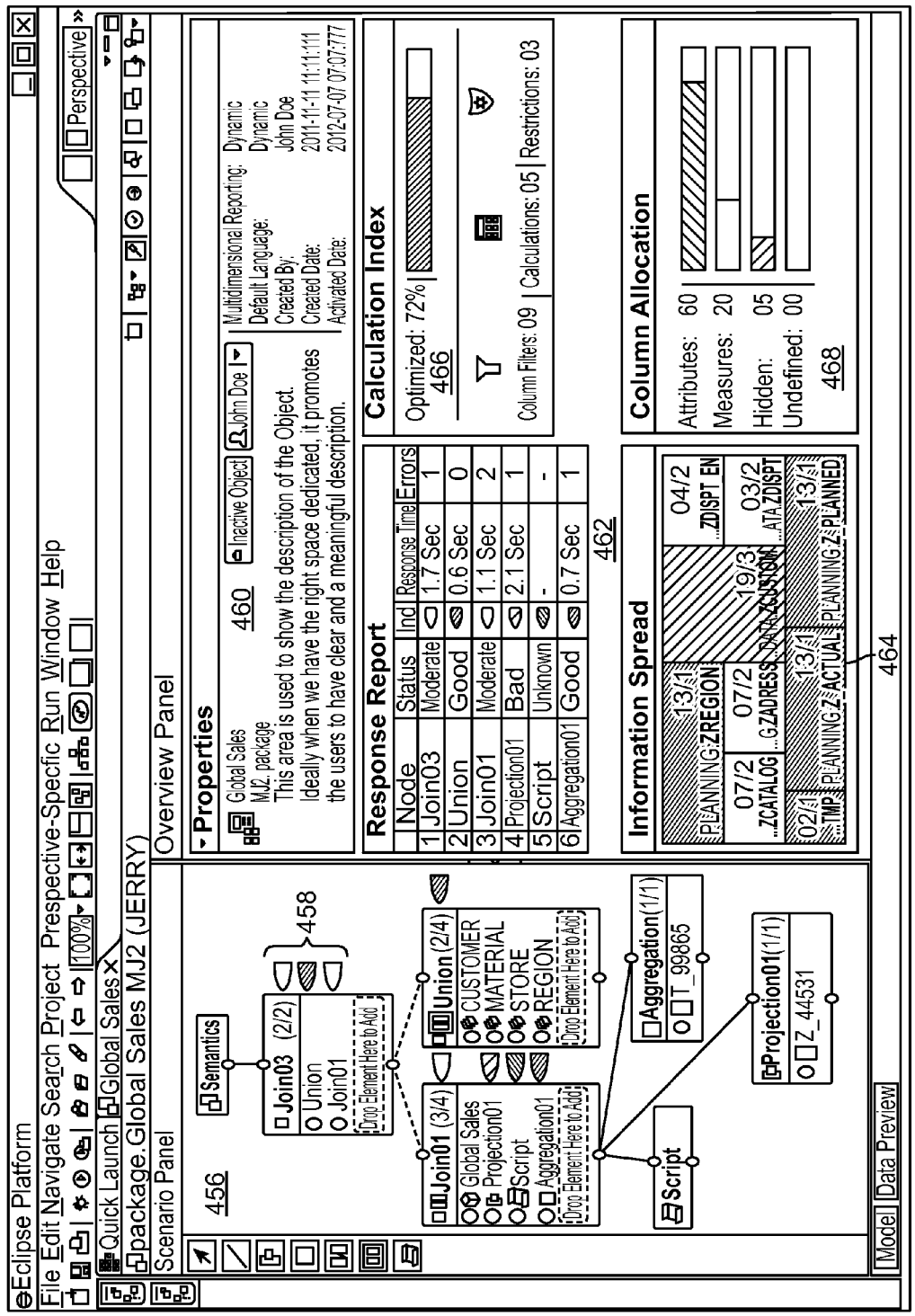
Figure 4B:
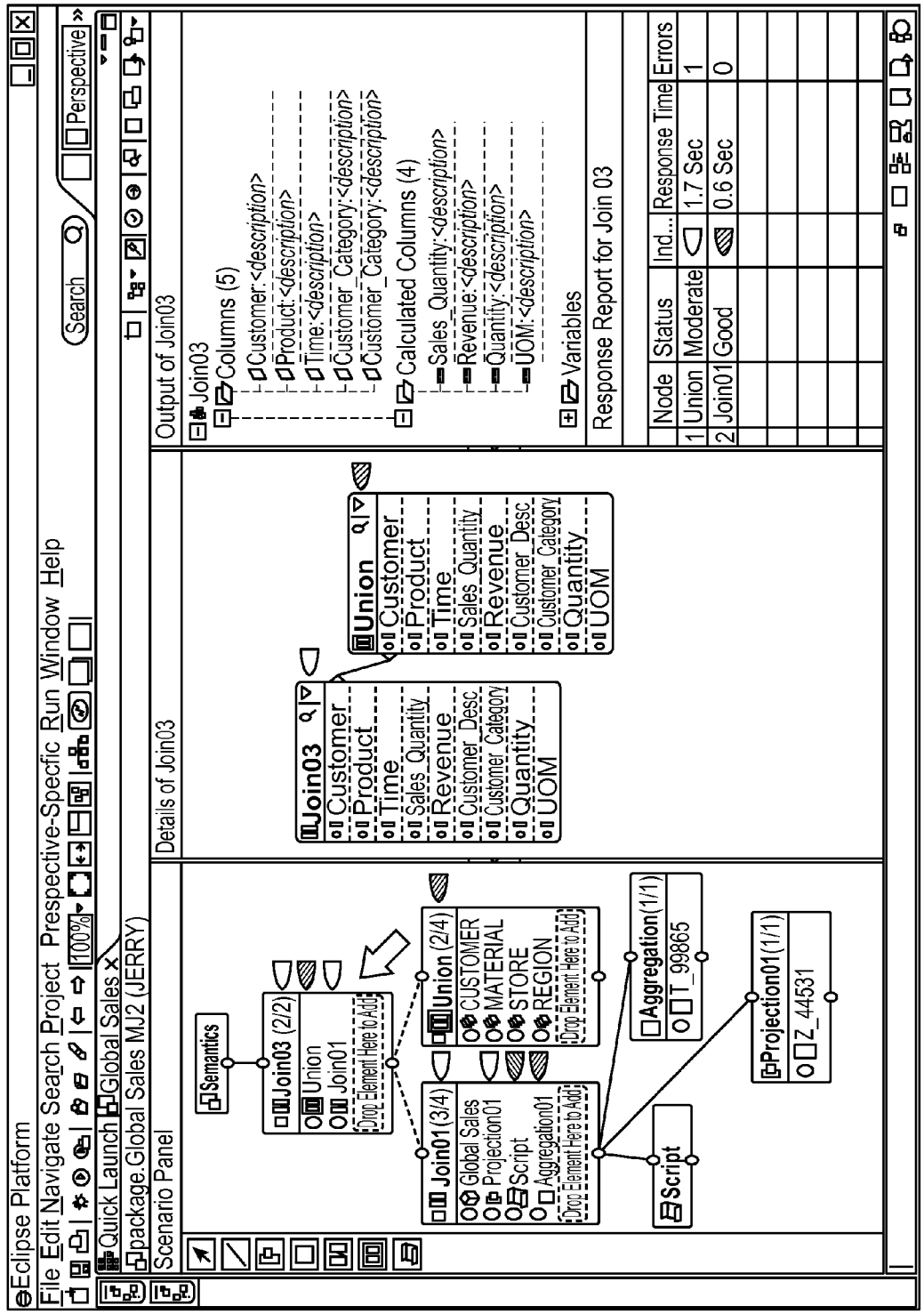

FIGS. 4BA-BC show screen shots for another example of a modeling interface according to an embodiment. The screen shots of this interface focus upon the presentation of information relating to model optimization.

Specifically, FIG. 4BA shows a typical dashboard-like screen displaying the model definition, along with some statistics of the column spread etc. FIG. 4BB shows another screen shot of another perspective of the same model.

In particular, FIG. 4BA is a screenshot showing model creation and other activity. Once the user has completed modeling activity, the overview of FIG. 4BA is presented upon clicking the semantic node 450. Button/icon 452 shows that the user is currently in the modeling mode.

Button/icon 454 of FIG. 4BA shows the manner in which a user may switch to display the optimization mode. In particular, the screenshot of FIG. 4BB displays information relevant to model optimization metrics.

The user interface of FIG. 4BB is specific to optimization. This user interface captures the different aspect one would monitor the optimization from a model level.

The group box at the top of the Overview Panel, is common to both of the model perspectives of FIGS. 4BA and 4BB. The group box in the middle left portion of FIG. 4BB, shows a list of all model operational steps and their optimization rating.

Information presented in the middle right portion of FIG. 4BB, gives the user an indication of the general optimization score along with the count of calculations, filters and restrictions applied. These might have an impact on the performance of the model.

Information presented in the bottom left of FIG. 4BB, is a heat map showing all the DSOs used in this model, the number of time the DSO has been imported, and the number of columns selected from them. Certain embodiments could display the total number of columns in the DSO against the number of columns selected.

Together with this optimization information, execution reports of the steps of the model are shown. Modeling capabilities are turned off in this mode.

The scenario panel 456 of the optimization view of FIG. 4BB, includes indicators 458 showing optimization at every step. These are propagated to the container in which they reside.

The overview panel 460 of the optimization view of FIG. 4BB, includes several different types of information. For example, a response report 462 (middle left) comprises a grid displaying the response time for every node.

An information spread 464 (bottom left) includes a map chart showing the tables used in the model, either directly or indirectly. This information spread can also help a user to identify redundancies of the model that may affect its performance.

A calculation index 466 (middle right) is also shown in the overview panel. This gauge serves to communicate intense processing tasks to be performed by the modeling engine in executing the model.

The overview panel also shows a column allocation 468. This diagram shows how the columns are allocated.

For the one view editor, this may be important as there may not be an icon to denote if this is deployed as an attribute, Analytic, or a Calculation View. In particular, there may be three different objects to bring a common understanding from the business warehouse world, and the engine may deploy a model differently when it knows what the object type is. This may evolve as the trend moves toward the one view approach.

Here, the engine decides what the object is, and based on that it will deploy the object. A benefit is that the user doesn't have to know what the final object should be. The final object can change as and when the models evolve.

FIG. 4BC shows a screenshot wherein the user has returned to the modeling mode to view model details. In particular, clicking on the Join03 step of the scenario panel, causes the panel 470 shows details of that step.

In FIG. 4BC, it is noted that the performance indicators continue to be displayed on both the Scenario Panel and the detail panel. The response report is continued on the subsequent steps of the model as well.

Interfaces according to various embodiments may offer certain benefits. For example, some embodiments may provide one or more of the following:
- heighten the overall end user experience of the modeling activity;
- reduce errors caused while modeling, and identify latency issues much more quickly;
- reduce reliance upon trial and error approaches;
- help novice users scale up and offer a much faster pose;
- allow exploring the capabilities of showing information at every modeling step.

Figure 5:
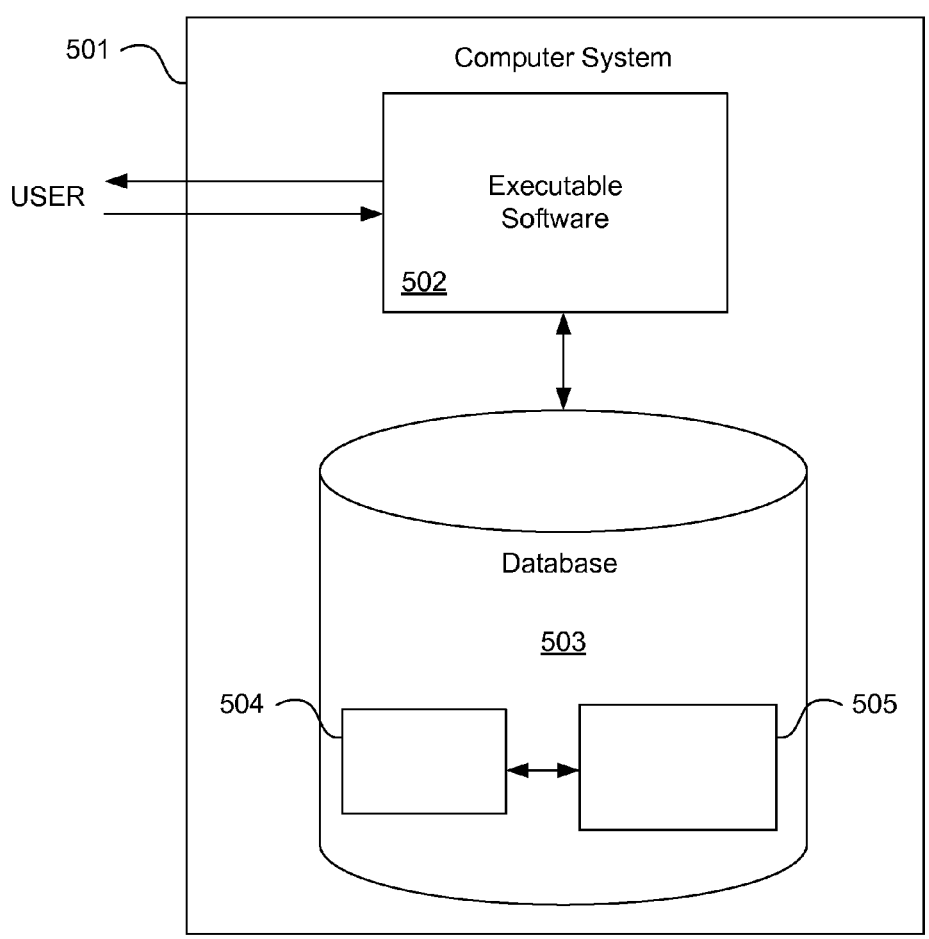
FIG. 5 illustrates hardware of a special purpose computing machine configured to perform modeling according to an embodiment.

FIG. 5 illustrates hardware of a special purpose computing machine configured to provide a modeling interface according to an embodiment. In particular, computer system 500 comprises a processor 502 that is in electronic communication with a non-transitory computer-readable storage medium 503. This computer-readable storage medium has stored thereon code 505 corresponding to a modeling engine. Code 504 corresponds to a database engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 6:
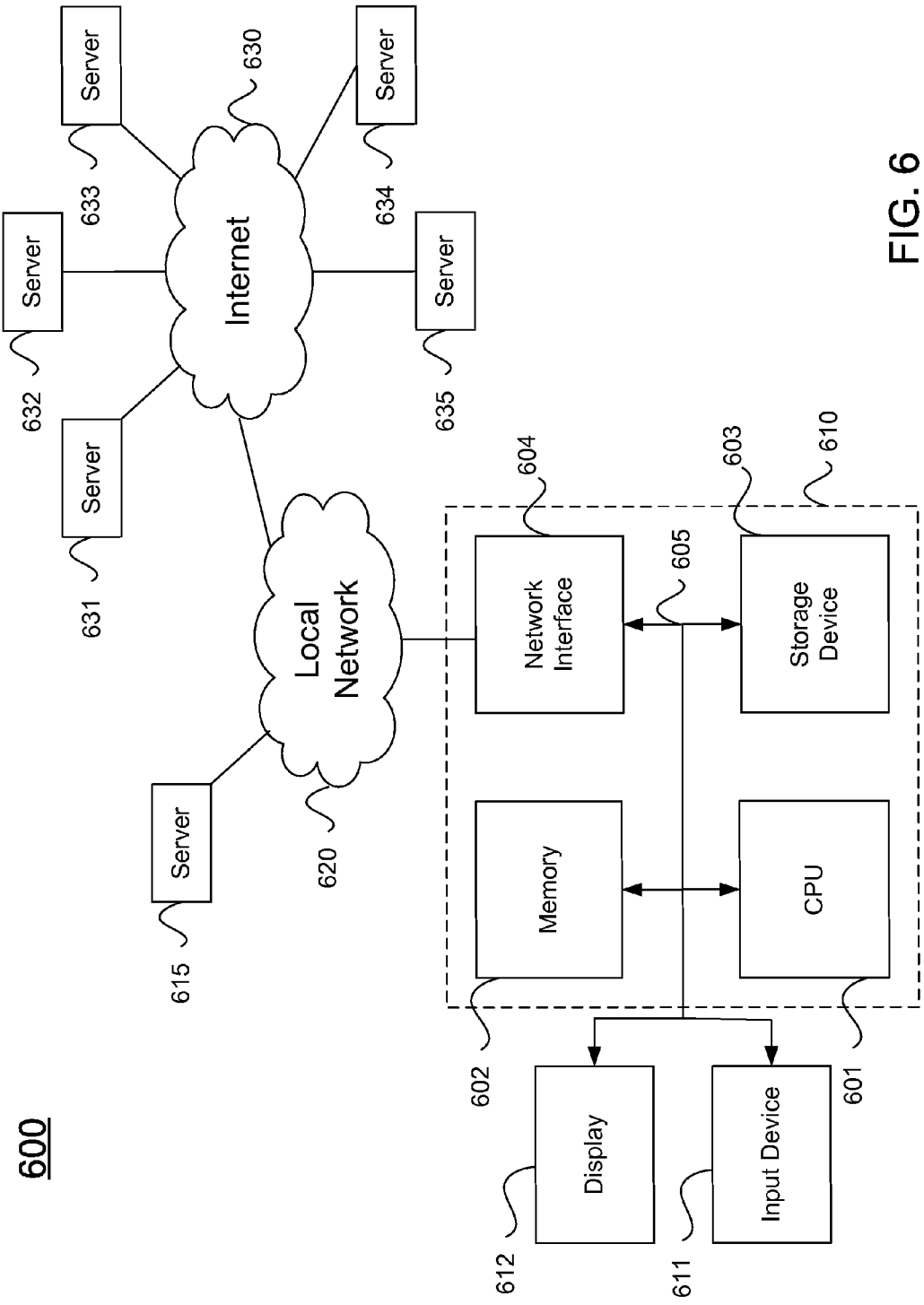
FIG. 6 illustrates an example of a computer system.

An example computer system 610 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 310 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
providing a modeling engine within an application layer that is in communication with a database of a database layer via a database engine;
causing the modeling engine to construct a model referencing the database;
causing the modeling engine to execute a step of the model;
causing the modeling engine to receive a performance indicia of execution of the step;
causing the modeling engine to display the performance indicia on a user interface; and
causing the modeling engine to generate an optimization recommendation from the performance indicia, and to provide the optimization recommendation to the user interface;
wherein the modeling engine is further configured to receive from the user interface an acceptance of the optimization recommendation, to modify the model based upon the optimization recommendation, and to depict an updated model reflecting the optimization recommendation as a flow of steps represented by shapes arranged in a vertical direction.

2. A method as in claim 1 wherein the performance indicia is selected from a time to execute the step, a number of database rows accessed by the step, and a computing power consumed by the step.

3. A method as in claim 1 wherein the modeling engine is further configured to generate an optimization value from the performance indicia, and to provide the optimization value to the user interface.

4. A method as in claim 1 wherein the application layer is situated in a same device with the database layer.

5. A method as in claim 1 wherein the database comprises an in memory database, and the modeling engine leverages a computational power of the database engine.

6. A non-transitory computer readable storage medium embodying a computer program for performing a method, said method comprising:
providing a modeling engine within an application layer that is in communication with a database of a database layer via a database engine;
causing the modeling engine to construct a model referencing the database;
causing the modeling engine to execute a step of the model;
causing the modeling engine to receive a performance indicia of execution of the step;
causing the modeling engine to display the performance indicia on a user interface;
causing the modeling engine to generate an optimization recommendation from the performance indicia; and
causing the modeling engine to provide the optimization recommendation to the user interface, wherein the modeling engine is further configured to receive from the user interface an acceptance of the optimization recommendation, to modify the model based upon the optimization recommendation, and to depict an updated model reflecting the optimization recommendation as a flow of steps represented by shapes arranged in a vertical direction.

7. A non-transitory computer readable storage medium as in claim 6 wherein the performance indicia is selected from a time to execute the step, a number of database rows accessed by the step, and a computing power consumed by the step.

8. A non-transitory computer readable storage medium as in claim 6 wherein the modeling engine is further configured to generate an optimization value from the performance indicia, and to provide the optimization value to the user interface.

9. A non-transitory computer readable storage medium as in claim 6 wherein the application layer is situated in a same device with the database layer.

10. A non-transitory computer readable storage medium as in claim 6 wherein the database comprises an in memory database, and the modeling engine leverages a computational power of the database engine.

11. A computer system comprising:
one or more processors;
a software program, executable on said computer system, the software program configured to:
provide a modeling engine within an application layer that is in communication with a database of a database layer via a database engine;
cause the modeling engine to construct a model referencing the database;
cause the modeling engine to execute a step of the model;
cause the modeling engine to receive a performance indicia of execution of the step;
cause the modeling engine to display the performance indicia on a user interface;
cause the modeling engine to generate an optimization recommendation from the performance indicia; and
cause the modeling engine to provide the optimization recommendation to the user interface,
wherein the modeling engine is further configured to receive from the user interface an acceptance of the optimization recommendation, to modify the model based upon the optimization recommendation, and to depict an updated model reflecting the optimization recommendation as a flow of steps represented by shapes arranged in a vertical direction.

12. A computer system as in claim 11 wherein the performance indicia is selected from a time to execute the step, a number of database rows accessed by the step, and a computing power consumed by the step.

13. A computer system as in claim 11 wherein the modeling engine is further configured to generate an optimization value from the performance indicia, and to provide the optimization value to the user interface.

14. A computer system as in claim 11 wherein the application layer is situated in a same device with the database layer.

\* \* \* \* \*